United States Patent [19]
Selker et al.

[11] Patent Number: 5,867,808
[45] Date of Patent: Feb. 2, 1999

[54] FORCE TRANSDUCER WITH SCREEN PRINTED STRAIN GAUGES

[75] Inventors: Edwin J. Selker, Palo Alto; Barton A. Smith, Campbell; Boris Kamentser, Fountain Valley, all of Calif.

[73] Assignee: International Business Machines Corporation, Armonk, N.Y.

[21] Appl. No.: 688,614

[22] Filed: Aug. 6, 1996

Related U.S. Application Data

[63] Continuation of Ser. No. 181,648, Jan. 14, 1994, abandoned.

[51] Int. Cl.$^6$ .......................... G06F 03/033; G01L 01/18; H01C 10/10
[52] U.S. Cl. ................................ 702/41; 338/2; 338/47; 338/307; 338/308; 338/314; 364/707.11
[58] Field of Search ..................... 73/726, 727; 338/2, 338/47, 307, 308, 314; 364/508, 558, 709.11; 702/41, 402

[56] References Cited

U.S. PATENT DOCUMENTS

| | | | |
|---|---|---|---|
| 3,447,766 | 6/1969 | Palfreyman | 338/2 X |
| 4,311,980 | 1/1982 | Prudenziati | 338/4 |
| 4,536,746 | 8/1985 | Gobeli | 340/365 |
| 4,550,316 | 10/1985 | Whetstone et al. | 340/710 |
| 4,782,319 | 11/1988 | Dell'Acqua et al. | 338/47 X |
| 4,932,265 | 6/1990 | Skuratovsky et al. | 73/727 |
| 5,107,710 | 4/1992 | Huck et al. | 73/727 X |
| 5,224,384 | 7/1993 | Kremidas et al. | 73/721 |
| 5,241,308 | 8/1993 | Young | 341/34 |
| 5,319,980 | 6/1994 | Kremidas | 73/726 X |
| 5,349,746 | 9/1994 | Gruenwald et al. | 338/4 X |
| 5,754,167 | 5/1998 | Narusawa et al. | 345/161 |

FOREIGN PATENT DOCUMENTS

| | | |
|---|---|---|
| 50-15669 | 6/1975 | Japan . |
| 59-155732 | 9/1984 | Japan . |
| 59-155735 | 9/1984 | Japan . |
| 62-153538 | 9/1987 | Japan . |
| 2000423 | 1/1998 | Japan . |
| 2 234 629 A | 2/1969 | United Kingdom . |
| PCT/US92/03194 | 4/1992 | WIPO . |
| WO 92/09996 | 6/1992 | WIPO . |

OTHER PUBLICATIONS

Sanjay Chitale, Cornelius Huang, and Michael Stein, "High Gauge Factor Thick Film Resistors For Strain Gauges," reprinted from *Hybrid Circuit Technology,* May 1989, Lake Publishing Corp., Libertyville, Illinois (7 pages).

*Primary Examiner*—Edward R. Cosimano
*Attorney, Agent, or Firm*—Gray Cary Ware Friedenrich

[57] ABSTRACT

A force transducer includes an elongated lever arm attached to a substrate having a central portion and substantially planar tab regions that project outwardly from the central portion along first and second orthogonal force-detecting axes. The substrate undergoes localized strain approximately at the junctions of the tab regions and the central portion when an external force is applied to the free end of the lever arm. A thick film strain gauge material is screen printed directly onto the substrate in at least a first location and a second location and conductive pads on the substrate are electrically coupled to the thick film strain gauge material at each location to define a first strain gauge oriented along the first force detecting axis and a second strain gauge oriented along the second force detecting axis. The lever arm can be of a compliant construction to provide proprioreceptive feedback to a user.

48 Claims, 11 Drawing Sheets

FORCE TRANSDUCER WITH SCREEN PRINTED STRAIN GAUGES

This application is a continuation of application U.S. Ser. No. 08/181,648 filed Jan. 14, 1994, now abandoned.

BACKGROUND OF THE INVENTION

1. Field of the Invention

This invention relates generally to force transducers and, more particularly, to resistive strain gauge force transducers for actuators.

2. Description of the Related Art

Force transducers for control actuators convert external forces applied to the actuator by a user into corresponding electrical signals that are used to control a device or position an object of a display. The external forces are converted into electrical signals that represent force components along orthogonal axes. For example, a joystick-type display controller for a computer includes a force transducer that converts forces applied to the joystick into two signals, one signal representing the component of force along an x axis and a second signal representing the component of force along a y axis that is orthogonal to the x axis. The relative magnitude of the x and y signals represent the relative amount of display pointer movement along the x and y axis desired by the user. A computer to which the display controller is attached receives the electrical signals and moves the display pointer accordingly. The force transducer of the display controller is provided with electrical power and generates the electrical signals representing the force components as the external force is applied.

The joystick-type display controller described above can include a force transducer comprising a lever arm that is mechanically coupled to a support base by an articulated joint. While the force transducer provides the needed force component electrical signals, the mechanical linkage needed to permit movement of the joystick in the desired directions is complex. In particular, the mechanical linkage is relatively large, bulky, and expensive. Also, the mechanical linkage is subject to wear and reliability problems.

As an alternative to the joystick force transducer with a mechanical linkage, force transducers have been developed with thin film resistive strain gauges. A thin film resistive strain gauge uses a conductive, thin film resistive strain gauge material that is deposited onto a thin, flexible substrate using photolithographic fabrication techniques. The strain gauge material undergoes a change in electrical resistivity when the underlying substrate is subjected to strain. If an electrical current is passed through the strain gauge material, the change in resistivity can be detected by an output voltage change and the relative amount of strain can be measured. The substrate is bonded onto the sides of the lever arm so that the substrate undergoes strain when forces are applied to the lever arm.

For example, the International Business Machine Corporation (IBM Corporation) "ThinkPad 750" laptop computer is provided with a display controller force transducer comprising a pointer actuator that extends upwardly from between keys of the computer keyboard between the left and right hands of a computer user whose hands are resting at the keyboard home position. The lever arm includes the thin film strain gauges described above. As forces are applied to the lever arm, the strain is detected and is used to control a display pointer. This permits a user to control the associated display pointer without removing his or her hands from the keyboard. The user's hands otherwise would need to move from the keyboard to manipulate, for example, a display mouse controller or joystick controller.

The force transducer using thin film resistive strain gauge technology represents a valuable advance over mechanical linkage force transducers. The thin film force transducer is much smaller and lighter than the mechanical linkage and therefore is ideally suited to installation in tight spaces, such as beneath the keyboard of a laptop computer. Moreover, the thin film force transducer contains no moving parts. Thus, the wear and reliability problems of the mechanical linkage are virtually eliminated. Unfortunately, the thin film resistive strain gauges produce output signals with a relatively low signal-to-noise ratio. The electrical environment within a laptop computer includes many different sources of electrical and magnetic interference that make processing the force transducer output signals difficult. In addition, the thin film resistive strain gauges are relatively expensive to produce.

From the discussion above, it should be apparent that there is a need for a force transducer that is sufficiently small to be suitable for use in tight spaces such as computer keyboards, provides improved signal-to-noise characteristics for easier signal processing, is reliable for improved performance and greater service life, and can be produced at a competitive cost. The present invention satisfies this need.

SUMMARY OF THE INVENTION

In accordance with the invention, a force transducer includes an elongated lever arm attached to a substrate having strain gauges constructed from thick film resistive strain gauge material. The thick film strain gauge material is deposited directly onto the substrate using thick film screen printing techniques, which are much less expensive than thin film photolithographic techniques. The thick film strain gauges provide a force transducer that is much smaller than a mechanical transducer and with better reliability, can be produced much more cheaply than thin film force transducers, and provide output signals with improved, higher signal-to-noise ratios.

The lever arm has a fixed end and a free end to which an external force is applied. The substrate includes a central portion at which the fixed end of the lever arm is attached and substantially planar tab regions that project outwardly from the central portion along first and second orthogonal force-detecting axes so that the substrate undergoes localized strain approximately at the junctions of the tab regions and the central portion when the external force is applied to the free end of the lever arm. As noted above, the thick film strain gauge material is printed directly onto the substrate. Such monolithic construction provides a force transducer that is much easier to produce than the thin film photolithographic technology commonly used.

In one aspect of the invention, the thick film resistive strain gauge material is printed in at least a first location and a second location such that the strain gauge material at each location bridges the central portion and a tab region across a respective tab region-central portion junction of localized strain. The force transducer includes conductive pads on the substrate that are electrically coupled to the thick film strain gauge material at each location to define a first strain gauge having an electrical path through the first location oriented along the first force detecting axis and a second strain gauge having an electrical path through the second location oriented along the second force detecting axis.

In another aspect of the invention, the substrate comprises a substantially planar material having a top surface and a bottom surface, and the strain gauge material is deposited on both the top surface and bottom surface. Combining the electrical signals from the top strain gauges and the bottom strain gauges cancels out temperature affects and improves the signal-to-noise ratio of the output signal.

In yet another aspect of the invention, the force transducer includes a trim resistor that can be adjusted to balance the strain gauge resistances and compensate for inaccuracies in the thick film deposition. The trim resistor is preferably placed at a low stress portion of the substrate, which can be provided with a notch, or undercut. Finally, the lever arm can be of a compliant construction, to provide proprioreceptive feedback to the user.

Other features and advantages of the present invention should be apparent from the following description of the preferred embodiments, which illustrates, by way of example, the principles of the invention.

DESCRIPTION OF THE PREFERRED EMBODIMENTS

Figure 1:
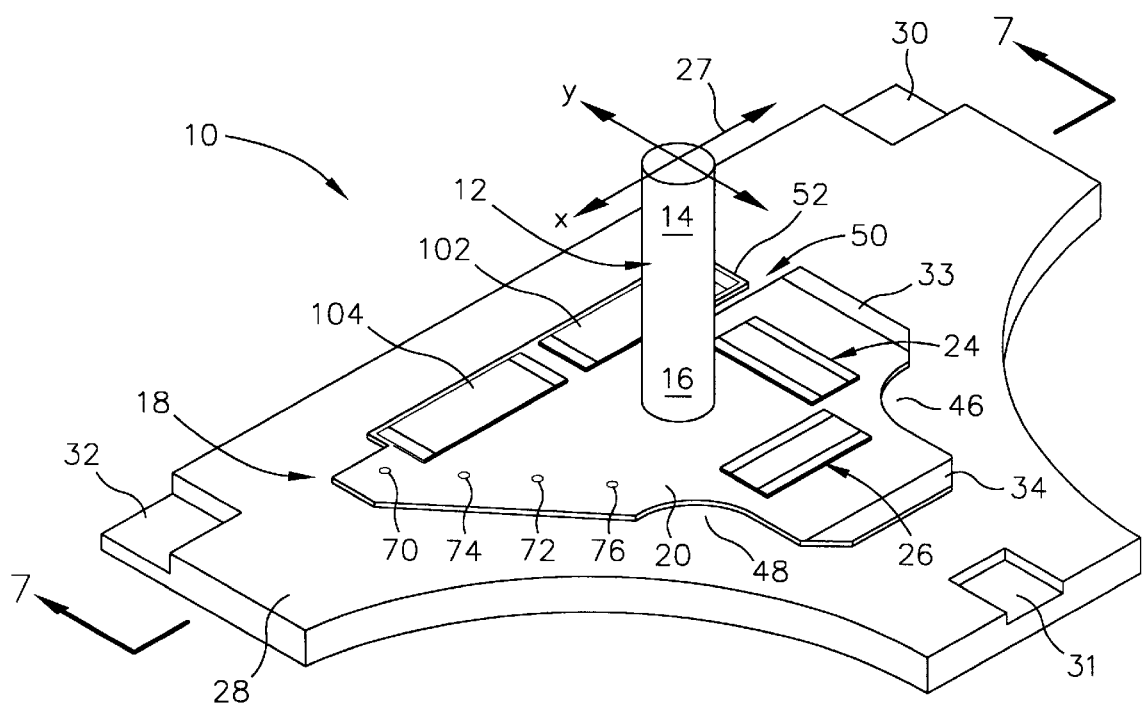
FIG. 1 is a perspective view of a force transducer constructed in accordance with the present invention.

FIG. 1 shows an enlarged perspective view of a force transducer 10 constructed in accordance with the present invention and specially adapted for use in a laptop computer keyboard (not illustrated). The force transducer includes a lever arm 12 to which a user applies external forces at a free end 14. The opposite, fixed end 16 of the lever arm is attached to a sensing element 18 that includes a generally planar substrate 20. The sensing element 18 includes thick film strain gauges 24, 26 that detect the force components in the x direction and y direction, respectively, indicated by the arrows 27. The strain gauges are constructed by screen printing thick film resistive strain gauge material directly onto the substrate 20. The thick film material proportionally changes resistivity when the substrate on which it is deposited experiences strain. Thus, the force transducer has no moving parts. In this way, the force transducer 10 is sufficiently small for application in tight spaces, such as computer keyboards, and has good reliability and long service life when compared with mechanical linkage force transducers. The thick film material experiences a much greater resistivity change from strain as compared with metal thin film materials, providing a transducer that has better signal-to-noise ratios. For example, the change in resistivity produces an output voltage change that is greater than the change produced from metal thin film material by an order of magnitude. The monolithic construction of the present invention provides a force transducer that can be produced at less cost than thin film photolithographic technology force transducers.

Because the force transducer 10 illustrated in FIG. 1 is specially adapted for use in a laptop computer keyboard, the sensing element 18 is mounted on a support plate 28 that can be securely attached to the computer. The support plate holds the sensing element in the proper orientation and provides a stable platform against which a user can apply forces to the lever arm 12. The support plate also can provide protection against excessive applied forces that otherwise might over-stress and damage the sensing element 18. The support plate includes three notches 30, 31, 32 that can be used to mount the force transducer 10, for example, to the keyboard plate or laptop case of the computer (not illustrated). The sensing element 18 is affixed to the support plate at two outer attachment points 33, 34.

Figure 2:
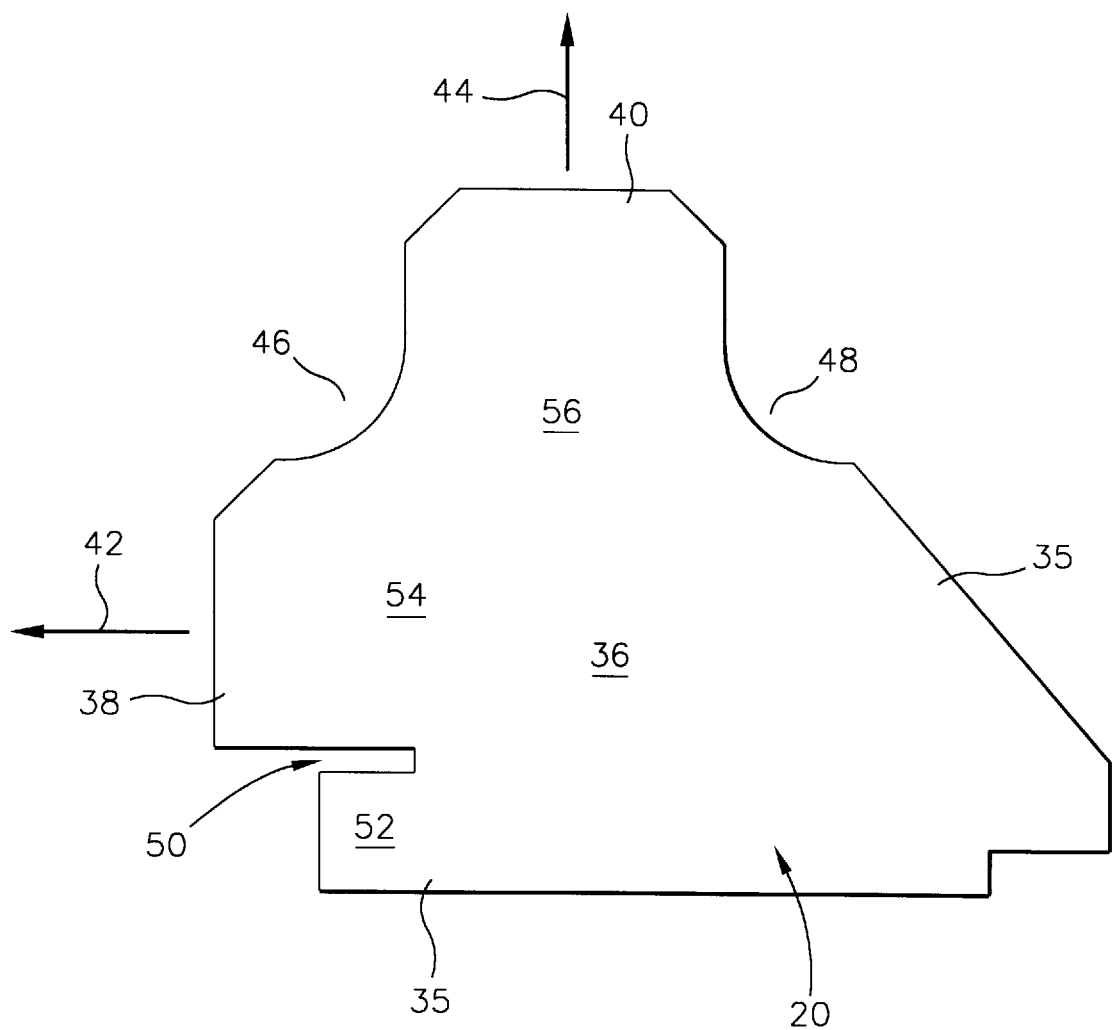
FIG. 2 is a schematic view of the substrate for the force transducer illustrated in FIG. 1.

FIG. 2 shows the top surface 35 of the substrate 20 before any thick film resistive strain gauge material has been applied. As illustrated in FIG. 2, the substrate comprises a substantially planar sheet of ceramic material. The substrate includes a central portion 36 and two tab regions 38, 40 that extend outwardly from the central portion along two orthogonal axes 42, 44, respectively. The lever arm 12 is not illustrated in FIG. 2 for clarity, but is attached to the central portion 36. The substrate 20 includes indentations 46, 48 and a trim notch 50 that function to localize the stress experienced by the substrate when forces are applied to the lever arm 12 at the central portion 36. The trim notch also serves to create a relatively stress-free trim resistor region 52, as described further below.

More particularly, when forces are applied to the lever arm 12, and a suitable stable platform is provided for the substrate 20, the substrate will undergo stress that is localized approximately at the junction 54, 56 of each respective tab region 38, 40 to the substrate central portion 36 for the respective axes 42, 44. The thick film resistive strain gauge material preferably is deposited in the locations of localized strain 54, 56. In this way, the substrate tab regions act as cantilever beams to concentrate the strain and produce the tension and compression of the thick film strain gauge material necessary for changes in resistivity.

Figure 3:
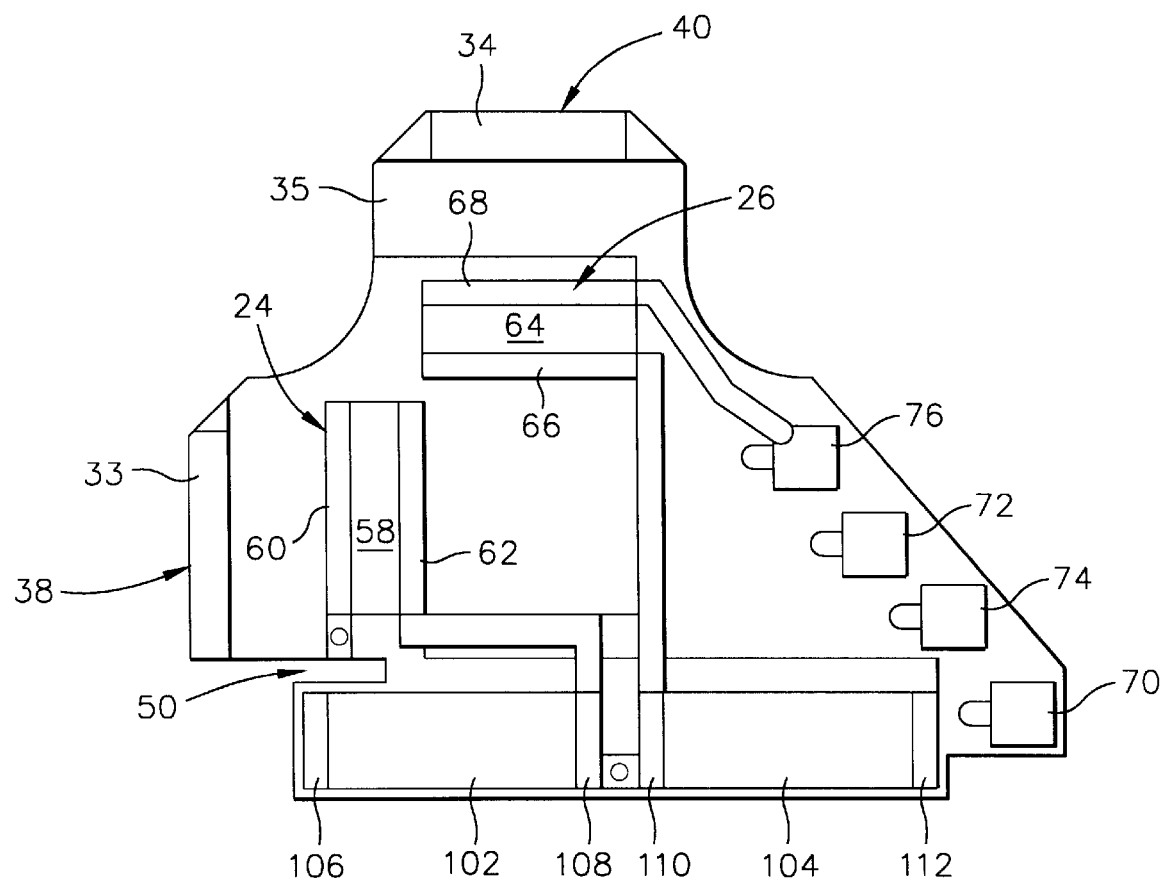
FIG. 3 is a top view of the substrate, with thick film strain gauges, for the force transducer illustrated in FIG. 1.

FIG. 3 shows the top surface 35 of the substrate 20 after the thick film strain gauges 24, 26 have been formed. To produce the strain gauges, a thick film strain gauge material is deposited directly onto the substrate surface using relatively simple screen printing techniques. As known to those skilled in the art, the composition and thickness of the particular material used will determine the resistance of the strain gauge. Conductive pads are located on the substrate at opposite sides of each thick film strain gauge material to define an electrical path through the material with the proper orientation.

For example, the first strain gauge 24 is used for detecting forces applied along the x axis as indicated by the arrows 27 illustrated in FIG. 1. Therefore, thick film strain gauge material 58 is screen printed on the substrate 20 in the region of localized stress 54 for x-axis forces. Conductive pads 60, 62 are located on opposite sides of the strain gauge material so they define an electrical path through the material that flows along the x axis, parallel to the direction of substrate strain. In this way, when the substrate 20 undergoes strain due to a force component directed along the x axis, the thick film strain gauge material 58 will be under tension or compression, depending on the direction of the force along the x axis. The tension or compression therefore will change the resistivity of the strain gauge material, which can be measured.

Similarly, the second strain gauge 26 is used for detecting forces applied along the y axis. Therefore, thick film strain gauge material 64 is screen printed on the substrate 20 in the region of localized stress 56 for y-axis forces. Conductive pads 66, 68 are located on opposite sides of the strain gauge material so they define an electrical path through the material that flows along the y axis, parallel to the strain. In this way, when the substrate 20 undergoes strain due to a force component directed along the y axis, the thick film strain gauge material 64 will be under tension or compression, depending on the direction of the force along the y axis. Again, the tension or compression therefore will change the resistivity of the strain gauge material, which can be measured.

To measure the change in resistivity of the respective thick film strain gauge material locations 58 and 64, the substrate 20 is provided with terminal pads for electrical connections. Thus, voltage supply terminal pads 70, 72 are connected to a source of electrical power (not illustrated). One supply terminal pad, in turn, is connected to one of the conductive pads of each strain gauge 24, 26 via a printed circuit-type connection. The output signal of each strain gauge 24, 26 is connected to a respective x output terminal pad 74 or y output terminal pad 76.

In the preferred embodiment, the force transducer 10 is of a half-bridge configuration. Thus, each strain gauge on the top surface 35 of the substrate 20 has a corresponding strain gauge on the bottom surface of the substrate and the respective output signals are combined. Those skilled in the art will appreciate that the strain gauges located on the bottom surface of the substrate react oppositely to those located on the top surface, in terms of tension and compression. When the signals from the strain gauges on the bottom surface are combined with the signals from the strain gauges on the top surface, the combined signals can cancel out any changes in the resistivity due to environmental effects, such as temperature changes. As a result, the signal-to-noise ratios of the x output signal and y output signal are increased.

Figure 4:
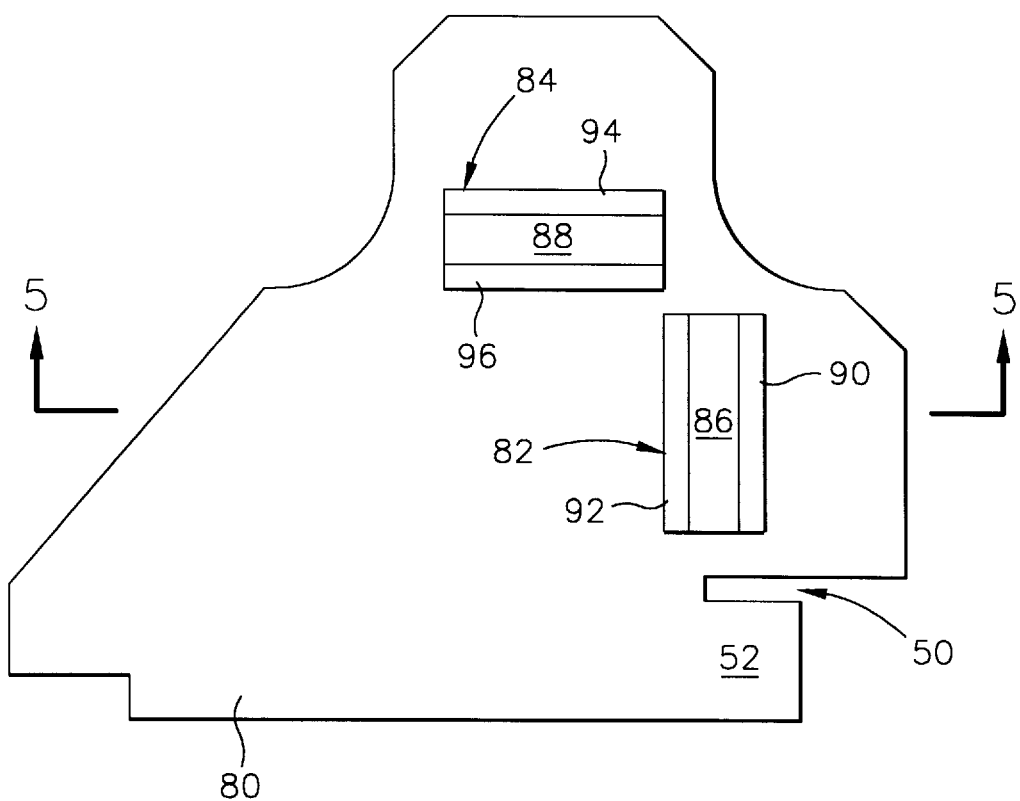
FIG. 4 is a bottom view of the substrate, with thick film strain gauges, for the force transducer illustrated in FIG. 1.
Figure 5:
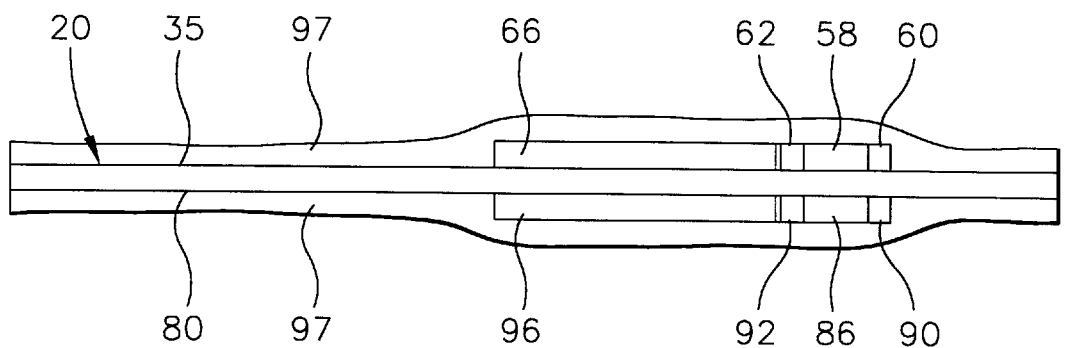
FIG. 5 is a cross-section of the substrate illustrated in FIGS. 3 and 4.

FIG. 4 shows the bottom surface 80 of the substrate 20 after thick film strain gauges 82, 84 have been formed. As before, one of the strain gauges 82 is for detecting forces applied along the x axis as indicated by the arrows 22 (see FIG. 1) and another one of the strain gauges 84 is used for detecting forces applied along the y axis. Again, the strain gauges are produced by depositing thick film strain gauge material directly onto the substrate bottom surface using screen printing techniques. Also, the thick film strain gauge material 86, 88 is located on the bottom surface in corresponding regions of localized stress 54, 56 in the substrate 20, respectively. Finally, conductive pads 90, 92 are located on opposite sides of the x axis strain gauge material 86 and conductive pads 94, 96 are located on opposite sides of the y axis strain gauge material 88 to define appropriate electrical paths through the respective strain gauge material locations. As described further below, the top surface strain gauges are electrically connected with the bottom surface strain gauges to provide the desired output signals. FIG. 5 is a cross-section through the sensing element 18 and illustrates that the thick film strain gauge material is located on opposite surfaces of the substrate. FIG. 5 also shows that the sensing element is covered with a coat of sealing material 97, shown greatly exaggerated in thickness. The sealing material protects the screen printed resistive materials from environmental affects and thereby increases reliability.

In the preferred embodiment, the force transducer includes trim resistors that are used to balance the circuit formed by the electrical connection of the top surface and bottom surface strain gauges. The trim resistors are connected in series with their respective strain gauges and are constructed such that their resistance value can be adjusted so as to balance the resistance values of the strain gauges and will remain stable after the adjustment. The trim resistors can be adjusted using known laser ablation and abrasive techniques to remove a portion of the thick film trim resistor material and increase the resistance of the trim resistor.

Returning to FIG. 3, a trim resistor 102 for the x axis strain gauges 24, 82 is illustrated on the top surface 35 of the substrate 20 and a trim resistor 104 for the y axis strain gauges 26, 84 also is illustrated. The x axis trim resistor 102 includes conductive pads 106 and 108 to connect the x axis trim resistor to the x axis strain gauges. Similarly, conductive pads 110 and 112 and printed circuit connections connect the y axis trim resistor 104 to the y axis strain gauges.

Figure 6:
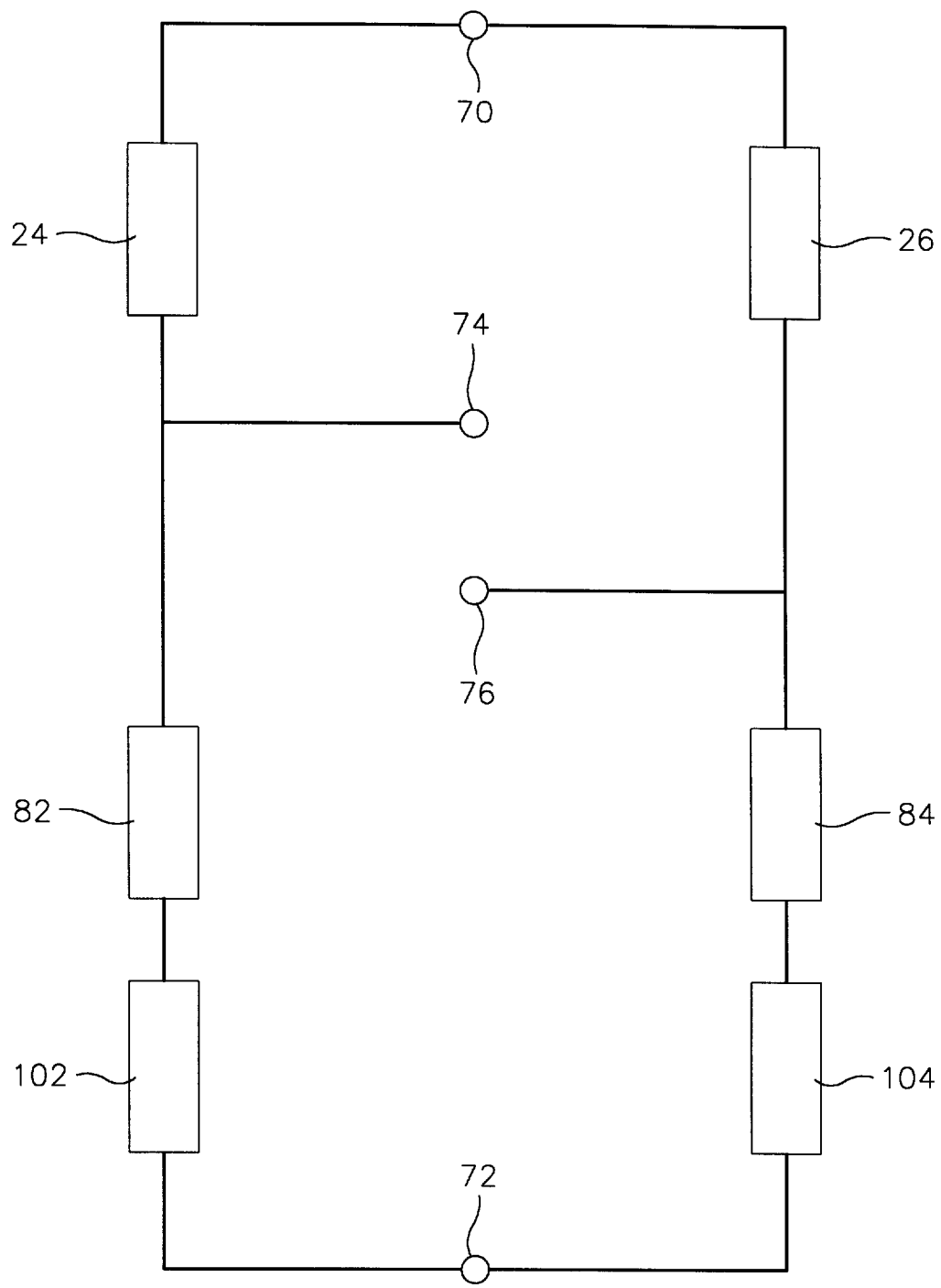
FIG. 6 is a schematic diagram of the strain gauge circuit, with trim resistors, for the force transducer illustrated in FIG. 1.

FIG. 6 is a schematic circuit diagram showing how the thick film resistive strain gauge material locations and the trim resistors 102, 104 are electrically connected in the preferred embodiment. As noted above, each of the strain gauge x and y circuits is provided with electrical power from the voltage supply terminal pads 70, 72 while the top and bottom strain gauge material locations and associated trim resistors are connected in series. The thick film resistive strain gauge material locations and trim resistors are connected to the respective output terminal pads 74, 76 to form voltage divider circuits. That is, the top surface x axis strain gauge 24 forms one half of a voltage divider circuit and the bottom surface strain gauge 82 and trim resistor 102 form a second half of an x axis voltage divider circuit. Similarly, the top surface y axis strain gauge 26 forms one half of a y axis voltage divider circuit and the bottom surface strain gauge 84 and trim resistor 104 form a second half of the y axis voltage divider circuit. Other circuit configurations are possible and will occur to those skilled in the art.

To balance the respective strain gauge voltage divider circuits, the nominal values of the top surface and bottom surface strain gauges are selected to permit the trim resistor to achieve balancing. This means that, if the resistance values of the strain gauges can be produced using thick film screen printing techniques to within an accuracy of plus or minus 20 percent, then the nominal value of the top surface strain gauge should be different from the nominal value of the bottom strain gauge so that the trim resistor can make up any difference in the actual strain gauge resistance values.

For example, if the top surface strain gauge resistance values are selected to be at a nominal value of 100 ohms, then the bottom surface strain gauges can be selected to have a nominal resistance value of 90 ohms. The trim resistor then could be selected to have a nominal resistance value of, for example, 50 ohms. In this way, if the top surface value was different from its nominal value of 100 ohms and the bottom strain gauge also was different from its nominal value of 90 ohms, the trim resistor should be able to be trimmed sufficiently so that its resistance value, when added to the actual resistance value of the bottom strain gauge, is substantially equal to the actual resistance value of the top surface strain gauge. It should be understood that these values are for purposes of illustration only and actual values will depend on the particular circuit, as known to those skilled in the art.

In practice, the actual resistance values of the top surface strain gauges and bottom surface strain gauges do not often fit the worst-case scenario. That is, the top surface strain gauge typically will not be high (or low) when the bottom surface strain gauge is low (or high). This is because the same variations in the screen printing process that causes the top surface strain gauges to vary also causes the bottom surface strain gauges to vary. Thus, the strain gauges likely will vary in the same manner. In practice, reasonable nominal values of 100, 90, and 20 ohms for the top surface strain gauge, bottom surface strain gauge, and trim resistor, respectively, should provide satisfactory results. Reducing the resistive value of the trim resistors reduces the cost of materials and simplifies the process of trimming the resistors. Again, these values are for purposes of illustration only.

The force transducer 10 illustrated in FIG. 1 is adapted to convert external forces applied to the lever arm 12 into electrical signals representing force components directed only along the x axis and y axis. Therefore, it is desirable to prevent force applied to the lever arm in the vertical direction along a z axis that is perpendicular to both the x axis and y axis from creating strain in the substrate 20. This is because stress from a vertical force would subject the substrate, and the strain gauges, to tension and compression, which could erroneously be interpreted as forces directed along the x axis and y axis.

Figure 7:
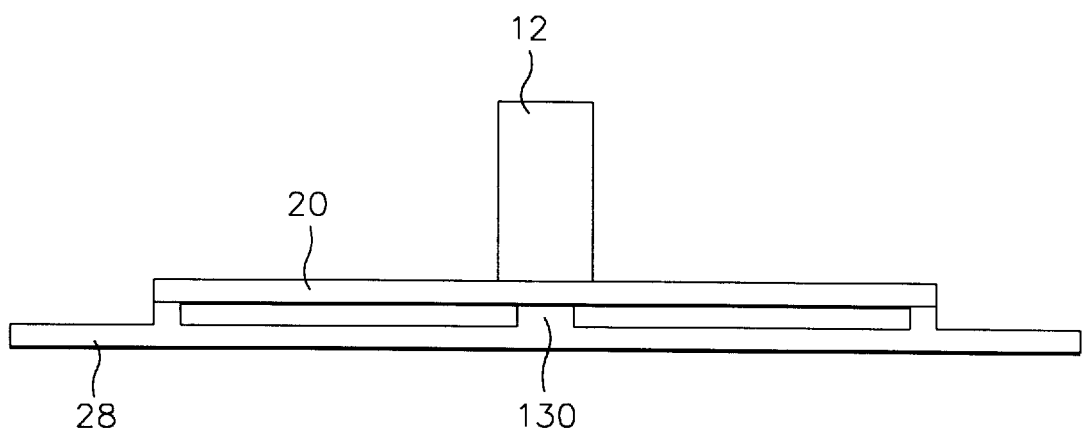
FIG. 7 is a cross-section of the force transducer illustrated in FIG. 1.

As noted above, the substrate 20 is attached to the support plate 28 at the outer edges 33, 34 of the tab regions 38, 40. This prevents vertical stressing at those locations. To prevent vertical forces applied to the lever arm from straining the substrate 20, the support plate 28 of the force transducer 10 includes a central support. This is illustrated in the cross-sectional view of FIG. 7. The central support is provided by a raised vertical stop 130 of the support plate that projects upwardly beneath the lever arm 12. Alternatively, the substrate 20 could be affixed across its entire bottom surface to a flat support plate, thereby providing a stable platform and preventing vertical lever arm forces from straining the substrate.

The composition of the trim resistors 102, 104 is different from the composition of the thick film strain gauge material 58, 64 used to construct the strain gauges. The material used to construct the strain gauges is selected for maximum change in resistance value when subjected to strain, thereby maximizing the signal-to-noise ratio. The material used to construct the trim resistors is not as sensitive to strain, but is selected for maximum tolerance of abrasive and ablative techniques that adjust the amount of resistive material deposited at the trim resistor locations.

As known to those skilled in the art, materials that are suitable for the strain gauges presently cannot be trimmed using abrasion or ablative techniques because the trimming process can cause the material to flake and crack. Although the material used for the trim resistors can sustain abrasion and ablation without immediate flaking and cracking, the integrity of the trim resistor material is compromised by the trimming process and damage such as flaking and cracking can occur to the material over time if it experiences strain. Therefore, the trim resistors are fabricated along the trim region 52 defined by the edge of the substrate and the trim notch 50 because this region is relatively free of strain even when external forces are applied to the lever arm. The stress-free characteristic is due in part to the trim notch, which relieves the trim region from the stress being experienced by the adjacent tab 38. In this way, the resistance values of the trim resistors should remain stable during the service life of the force transducer 10.

If space permits, a full bridge force transducer can be constructed that will provide improved signal-to-noise ratios for the output signals. If desired, the full bridge configuration also can be used to detect forces applied in the vertical direction along the z axis. A full bridge configuration would require opposed x and y axis strain gauge material locations on the top surface of the substrate and opposed x and y axis strain gauge material locations on the bottom surface of the substrate.

Figure 8:
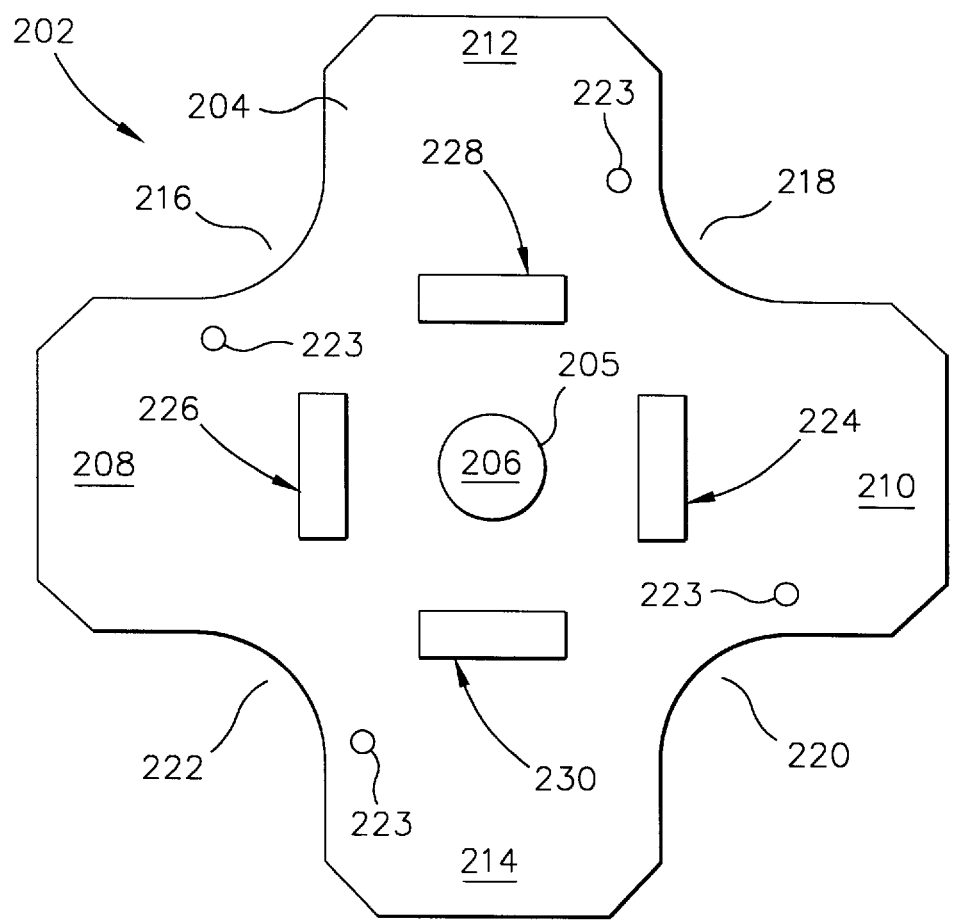
FIG. 8 is a schematic top view of a three-axis, full-bridge force transducer constructed in accordance with the present invention.

FIG. 8 illustrates the top surface of a force transducer 202 having a full bridge configuration and constructed in accordance with the principles of the invention. As illustrated in FIG. 8, the substrate 204 of the full bridge configuration has a central portion 205 at which a vertically oriented lever arm 206 is attached and includes opposed x axis tab regions 208, 210 and opposed y axis tab regions 212, 214 that extend outwardly from the central portion. As with the half-bridge configuration of FIGS. 1–7, the tab regions include cutouts 216, 218, 220, and 222 that function to localize the strain experienced by the substrate when force is applied to the lever arm 206. The area of strain localization is, once again, located substantially at the junction of each respective tab region with the central portion. Substrate attachment holes 223 also can be provided in the substrate.

Figure 9:
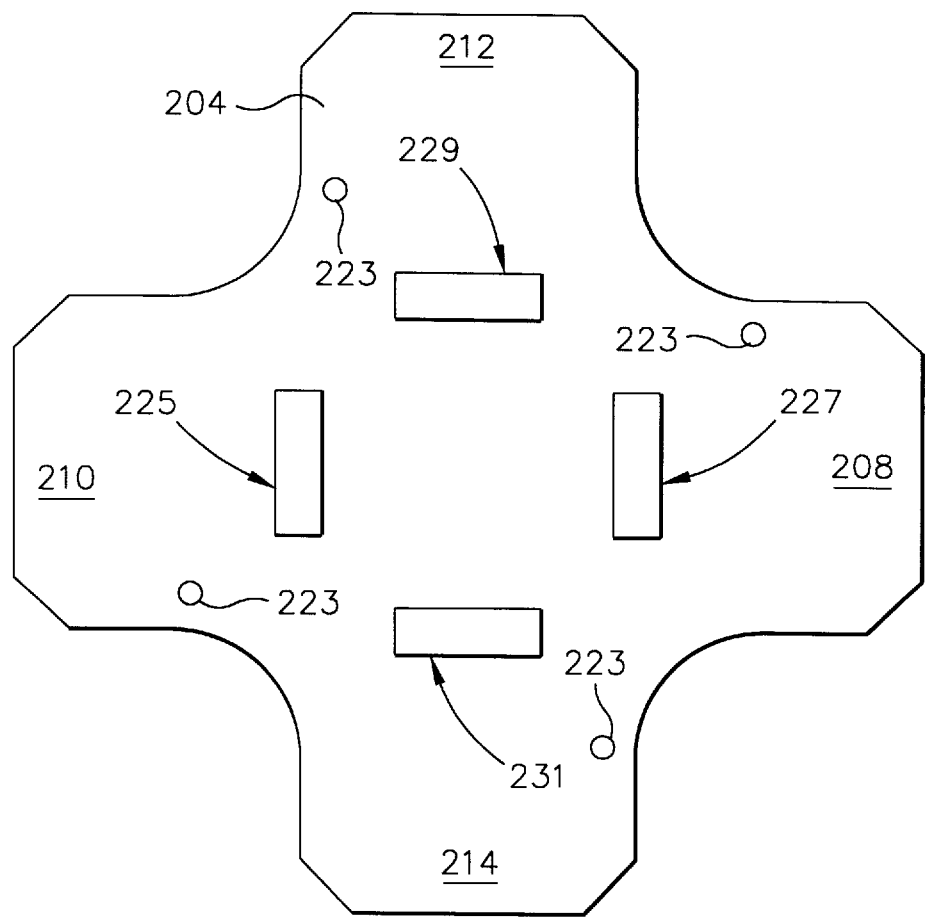
FIG. 9 is a bottom view of the force transducer illustrated in FIG. 8.

As with the half bridge configuration, thick film strain gauge material is deposited at the locations of localized strain, along with conductive pads, to define strain gauges at each of the localized strain locations. Thus, opposed x axis strain gauges 224 and 226 are formed on the top surface and opposed y axis strain gauges 228 and 230 also are formed on the upper surface. Those skilled in the art will appreciate that corresponding x and y strain gauges 225, 227, 229, 231 are formed on the bottom surface of the substrate 202, as illustrated in FIG. 9.

It should be appreciated that vertical forces applied to the lever arm can be distinguished from lateral forces applied in the x and y direction by determining the direction in which the output signals vary for each of the strain gauges. That is, the changes in the x output signal and y output signal determine whether respective strain gauges are undergoing tension or compression. The differential tension and compression can be used to distinguish lateral forces from vertical forces.

For example, a lateral force directed against the lever arm 206 to the left for the full bridge configuration transducer 202 illustrated in FIG. 8 will result in the leftmost top x axis strain gauge 226 undergoing compression and the rightmost top surface strain gauge 224 undergoing tension. Corresponding bottom surface strain gauges will experience opposite reactions, one strain gauge 227 experiencing tension and the other 225 experiencing compression. In contrast, for a vertical force, both top surface x axis strain gauges 224 and 226 will experience strain in the same direction, either tension or compression, and both bottom surface x axis strain gauges 225 and 227 will experience strain in the same direction but opposite to that of the top surface (either compression or tension). Those skilled in the art will appreciate that a similar analysis can be applied for distinguishing changes in the y output signals to indicate lateral forces and vertical forces.

In the illustrated embodiment of FIG. 1, the lever arm 12 is a generally rigid structure that is fixed to the substrate 20, on which the thick film strain gauge material is printed. Printing the thick film strain gauge material on the substrate permits greater freedom in constructing the lever arm. For example, it might be desirable to provide a lever arm having some compliance or flexibility so that the lever arm can deflect somewhat under the application of external forces. The compliance provides proprioceptive feedback for the actuator user. That is, the user receives information about how hard he or she is pressing by the amount of lever arm deflection. Those skilled in the art will recognize that no change in the output signal provided by the force transducer occurs as a result of using a compliant lever arm. This is because the amount of force applied to the lever arm remains unchanged and therefore the strain experienced by the substrate also remains unchanged.

Compliance of the lever arm also can be used to protect the force transducer from excessive applied forces that otherwise might damage it. A mechanical means of stopping the lever arm deflection and thus limiting the force that can be applied to the force transducer can be provided. If the force transducer with compliant lever arm is installed in a computer keyboard, for example, the adjacent keyboard keys can provide the mechanical stop.

Figure 10:
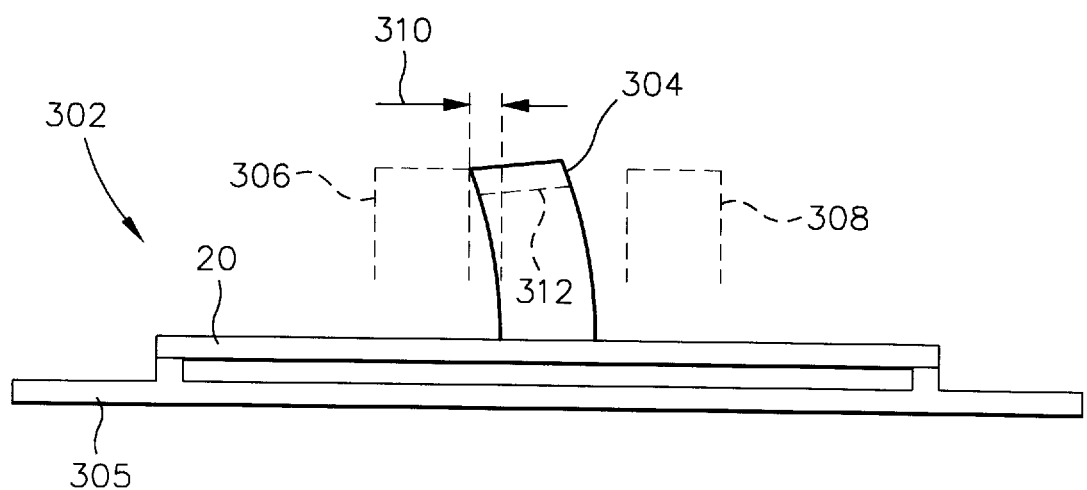
FIG. 10 is a side view of a force transducer constructed in accordance with the present invention having a compliant lever arm.

FIG. 10 shows a side view of a force transducer 302 constructed in accordance with the present invention and provided with a compliant lever arm 304. As with the embodiments described above, the lever arm is attached to a substrate 20 that is mounted on a support plate 305. The force transducer 302 is specially adapted for installation in a computer keyboard such that the lever arm 304 extends upwardly between particular alphanumeric keys, typically between the "G" and "H" keys. Such an arrangement provides equal access to the lever arm from both hands of a user.

The adjacent "G" and "H" keys 306 and 308, respectively, are illustrated in FIG. 10 in phantom, as indicated by the dashed lines. The amount of lever arm deflection possible before the lever arm 304 comes into contact with the adjacent "G" key 306 is illustrated in FIG. 10 by the arrows 310. It should be understood that a similar amount of deflection is possible in the opposite direction, toward the "H" key 308. Similar deflections are possible in the direction of the adjacent rows of keyboard keys. Similar deflections also are possible in the direction of the adjacent rows of keys.

If the force transducer is to be used to detect vertical forces, as described above, it also might be desirable to provide vertical compliance in the lever arm. The lever arm vertical compliance is illustrated in FIG. 10 by the dashed line 312. When a downward vertical force is applied to the lever arm 304, the lever arm can deflect until the practical limit of its compression or until the applied force stresses the substrate 20 and moves the bottom of the substrate so it makes contact with the support plate 305. As described above, the lever arm vertical compliance provides proprioceptive feedback for the user. Although the lever arm illustrated in FIG. 10 is illustrated undergoing simultaneous vertical and lateral deflection, it should be understood that the vertical deflection can occur with or without simultaneous lateral deflection. Because the force transducer 302 illustrated in FIG. 10 is to detect vertically directed forces, it should be noted that the support plate 305 contains no vertical support, as was provided in the support plate 28 illustrated in FIG. 7.

The compliant lever arm of FIG. 10 thus provides a force transducer that is more convenient to use, by virtue of the proprioceptive feedback, that is protected against overstressing, that results in no reduction in the signal-to-noise ratio, and still has no mechanical linkage for the lever arm.

Figure 11:
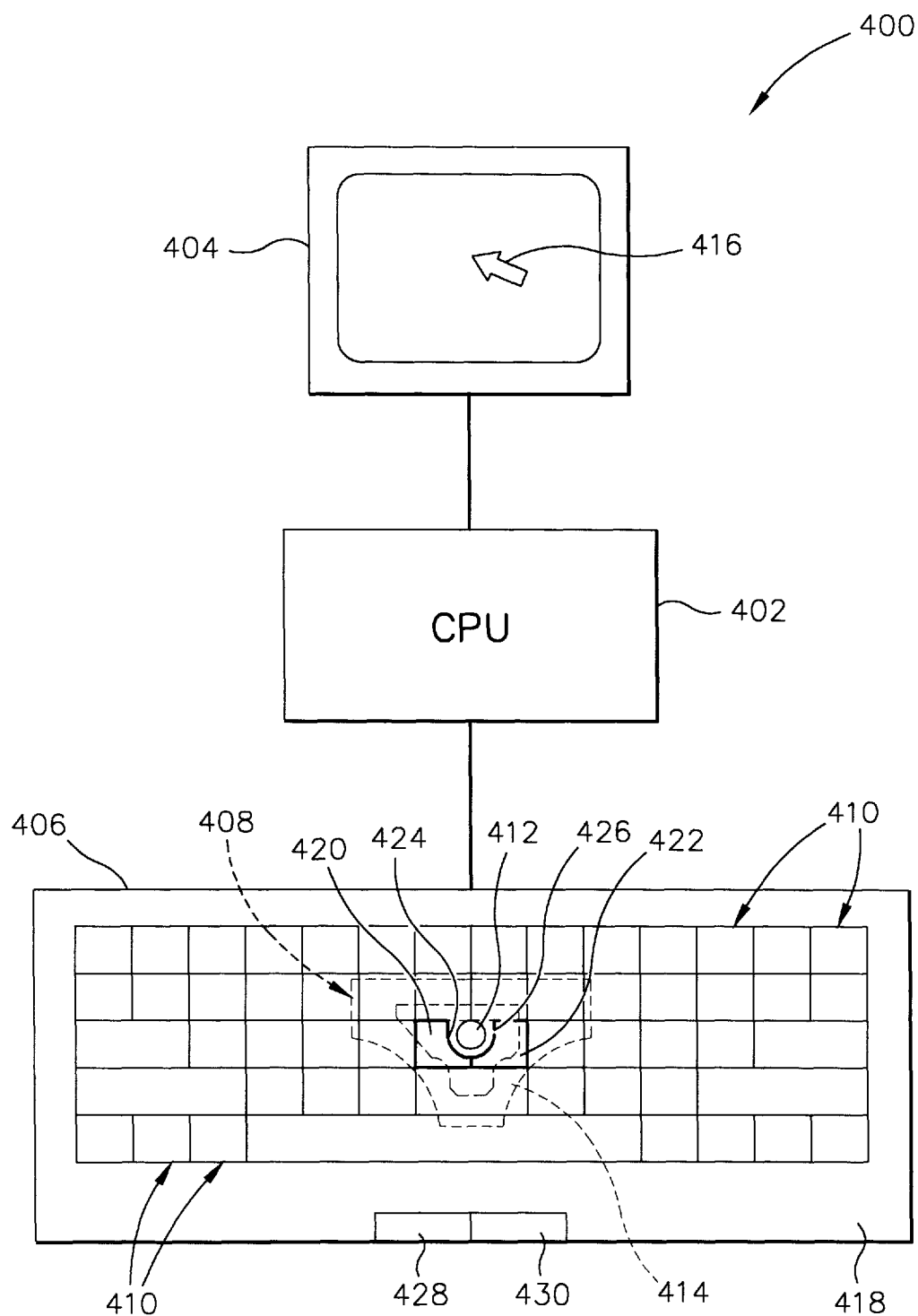
FIG. 11 is a representation of a computer system having the force transducer illustrated in FIG. 1 embedded in its keyboard.

The force transducer constructed in accordance with the invention, as described above, can be advantageously employed in a variety of circumstances, particularly where low cost, small size, and good signal-to-noise ratio are important. One preferred industrial application of the force transducer is for a computer display pointer control actuator that is embedded in a computer keyboard. As illustrated in FIG. 11, a computer system 400 includes a central processing unit 402, a display unit 404, and a computer keyboard 406. The keyboard includes a force transducer 408 (indicated in phantom by dashed lines), such as described above, located beneath the keys 410 of the keyboard such that the transducer lever arm 412 projects upwardly between the keyboard keys. It should be understood that the relative sizes of the elements illustrated in FIG. 11 are exaggerated to better show construction details. As a user applies force to the lever arm, the strain on the transducer substrate 414 is converted to a signal that is used by the computer central processing unit 402 to control, for example, a pointer 416 of the computer display unit 404, or some other function.

The keyboard 406 includes a casing 418 out of which the keys 410 project upwardly, and into which the transducer 408 is mounted. The transducer preferably is located beneath the keys of the keyboard between where the left and right hands of a computer user would be when placed at the keyboard home position. This location is advantageous because it permits a user to control the associated display pointer without removing his or her hands from the keyboard.

The keys 420, 422 adjacent to the lever arm 412 can be formed with indentations 424, 426 as needed to provide room for the lever arm to project upwardly between the keys, without disrupting the standard lateral spacing of the keys. It should be understood that other placements of the lever arm will occur to those skilled in the art, as will other modifications to the keys to accommodate the lever arm and key spacing. The lever arm preferably projects upwardly to a height slightly above the keys. In this way, the user can easily apply force to the lever arm and control the display pointer 416. The keyboard 406 can be provided with selection buttons 428, 430 so that a display selection can be made with the buttons after the transducer has been used to position the display pointer.

The force transducers described above utilize screen printed strain gauges comprising thick film strain gauge material that is directly printed onto substrates using screen printing techniques well known to those skilled in the art. The resulting force transducers retain the size and reliability advantages obtained from thin film strain gauge construction techniques but provide improved signal-to-noise ratios and can be produced at much lower cost. The transducer is advantageously employed in conditions requiring control actuators in small spaces, such as beneath computer keyboards.

The present invention has been described above in terms of presently preferred embodiments so that an understanding of the present invention can be conveyed. There are, however, many configurations for force transducers not specifically described herein but with which the present invention is applicable. The present invention should therefore not be seen as limited to the particular embodiments described herein, but rather, it should be understood that the present invention has wide applicability with respect to force transducers generally. All modifications, variations, or equivalent arrangements that are within the scope of the attached claims should therefore be considered to be within the scope of the invention.

We claim:

1. A force transducer comprising:

an elongated lever arm having a fixed end and a free end to which an external force is applied;

a sensing element that includes a substrate having a central portion at which the fixed end of the lever arm is attached and at least two substantially planar tab regions that project outwardly from the central portion along first and second orthogonal force detecting axes, the sensing element further including thick film strain gauge material printed onto the substrate in at least first and second locations and including conductive contacts on the substrate that are coupled to the strain gauge material to define a first electrical path and a second electrical path through the strain gauge material and are oriented along the first and second force detecting axes, respectively; and a support structure that supports the sensing element so that the substrate undergoes localized strain approximately at the junctions of the tab regions and the central portion when the external force is applied to the free end of the lever arm.

2. A force transducer as defined in claim 1, wherein the lever arm is compliant so as to deflect under the application of external force.

3. A force transducer as defined in claim 1, wherein the support structure supports the sensing element substrate at an outer edge of each tab region and at the central portion so that the substrate undergoes localized strain approximately where each tab region joins the central portion when a force is applied laterally to the free end of the lever arm and undergoes substantially no strain when a force is applied vertically along the longitudinal axis of the lever arm.

4. A force transducer as defined in claim 1, wherein:

the substrate includes a top surface and a bottom surface; and the thick film strain gauge material is located on the top surface of the substrate substantially at the areas of localized strain and the conductive contacts are located such that the electrical path through each strain gauge material is oriented parallel to the direction of localized strain.

5. A force transducer as defined in claim 4, wherein the thick film strain gauge material is located on the top surface and also on the bottom surface, and the conductive contacts are coupled to each location of strain gauge material, so as to define a first strain gauge associated with the first force detecting axis and a second strain gauge associated with the second force detecting axis such that each strain gauge includes strain gauge material of a location of the top surface and strain gauge material of a location of the bottom surface that undergo opposite types of strain when a force is applied to the lever arm, forming a half bridge circuit.

6. A force transducer as defined in claim 1, wherein the thick film strain gauge material is located on the substrate substantially at the areas of localized strain and the conductive contacts are located such that the electrical path through each strain gauge material location is parallel to the direction of localized strain.

7. A force transducer as defined in claim 6, wherein the sensing element further includes a trim resistor that is electrically coupled to the thick film strain gauge material at each tab region and has a resistance value sufficiently adjustable to balance the resistance value of the electrical circuit formed by the conducting contacts and thick film strain gauge material to within a predetermined accuracy.

8. A force transducer as defined in claim 7, wherein:

the trim resistor comprises a thick film resistive material printed onto the substrate at a trim location; and the substrate further includes a shape that relieves the trim location of the substrate from undergoing strain when an external force is applied to the lever arm.

9. A force transducer as defined in claim 1, wherein the substrate is substantially planar and includes four tab regions comprising two pairs of opposed tabs that extend along the first and second force detecting axes, the thick film strain gauge material is printed onto the substrate in first, second, third, and fourth locations substantially at the junction of each tab region and the central portion, and the conductive contacts on the substrate are coupled to the strain gauge material to define first, second, third, and fourth electrical paths through the respective strain gauge material locations.

10. A force transducer as defined in claim 9, wherein:

the substrate has a top surface and a bottom surface;

thick film strain gauge material is printed onto the top surface of the substrate in first, second, third, and fourth locations substantially at the junction of each tab region and the central portion, and thick film strain gauge material is printed onto the bottom surface of the substrate at fifth, sixth, seventh, and eighth locations thereon; and conductive contacts are at each location of strain gauge material, defining strain gauges along the first and second axes on the top surface and bottom surface such that corresponding top and bottom surface strain gauge material locations along each force detecting axis differentially experience tension and compression when a lateral force is applied to the lever arm and similarly experience tension or compression when a vertical force is applied to the lever arm, thereby permitting detection of lateral and vertical forces applied to the lever arm.

11. A force transducer as defined in claim 9, wherein the substrate includes a top surface and a bottom surface; and the thick film strain gauge material is located on the top surface of the substrate substantially at the areas of localized strain and the conductive contacts are located such that the electrical path through each strain gauge material is oriented parallel to the direction of localized strain.

12. A force transducer as defined in claim 11, wherein the thick film strain gauge material is located on the top surface and also on the bottom surface, and the conductive contacts are coupled to each location of strain gauge material, so as to define a first strain gauge associated with the first force detecting axis and a second strain gauge associated with the second force detecting axis such that each strain gauge includes strain gauge material of a location of the top surface and strain gauge material of a location of the bottom surface that undergo opposite types of strain when a force is applied to the lever arm, forming a full bridge circuit.

13. A force transducer as defined in claim 12, wherein the support structure supports the sensing element substrate at an outer edge of each tab region and at the central portion so that the substrate undergoes localized strain approximately where each tab region joins the central portion when a force is applied laterally to the free end of the lever arm and undergoes substantially no strain when a force is applied vertically along the longitudinal axis of the lever arm.

14. A force transducer comprising:
(a) an elongated lever arm having a fixed end and a free end to which an external force is applied; and
(b) a sensing element that includes
a substrate having a central portion at which the fixed end of the lever arm is attached and at least two substantially planar tab regions that project outwardly from the central portion along first and second orthogonal force detecting axes,
thick film strain gauge material printed onto the substrate in at least a first location and a second location such that the strain gauge material bridges the central portion and a respective tab region at each location of the strain gauge material, and
conductive contacts on the substrate that are electrically coupled to each location of strain gauge material to define a first strain gauge having an electrical path through the first location oriented along the first force detecting axis and a second strain gauge having an electrical path through the second location oriented along the second force detecting axis; and
(c) a support structure that supports the sensing element so that the substrate undergoes localized strain approximately at the junctions of the tab regions and the central portion when the external force is applied to the free end of the lever arm.

15. A force transducer as defined in claim 14, wherein:
the substrate includes a top surface and a bottom surface; and
the thick film strain gauge material is located on the top surface of the substrate substantially at the areas of localized strain and the conductive contacts are located such that the electrical path through each strain gauge material is oriented parallel to the direction of localized strain.

16. A force transducer as defined in claim 15, wherein the thick film strain gauge material is located on the top surface and also on the bottom surface, and the conductive contacts are coupled to each location of strain gauge material, so as to define a first strain gauge associated with the first force detecting axis and a second strain gauge associated with the second force detecting axis such that each strain gauge includes strain gauge material of a location of the top surface and strain gauge material of a location of the bottom surface that undergo opposite types of strain when a force is applied to the lever arm, forming a half bridge circuit.

17. A force transducer that receives external forces and generates an electrical signal indicating the components of an external force along at least two force detecting axes when connected to a source of electrical power, the force transducer comprising:
an elongated lever arm having a fixed end and a free end to which an external force is applied;
a substrate having a central portion at which the fixed end of the lever arm is attached and at least two substantially planar tab regions that project outwardly from the central portion along first and second orthogonal force detecting axes so that the substrate undergoes localized strain approximately at the junctions of the tab regions and the central portion when the external force is applied to the free end of the lever arm;

thick film strain gauge material printed onto the substrate in at least a first location and a second location such that the strain gauge material at each location bridges the central portion and a tab region across a respective tab region-central portion junction of localized strain;
conductive contacts on the substrate that are electrically coupled to the thick film strain gauge material at each location to define a first strain gauge having an electrical path through the first location oriented along the first force detecting axis and a second strain gauge having an electrical path through the second location oriented along the second force detecting axis;
a substrate power supply lead connected to the source of electrical power;
a substrate x-axis lead connected to the first strain gauge;
a substrate y-axis lead connected to the second strain gauge; and
a substrate ground lead connected to electrical ground; wherein:
respective electrical signals are produced at the x-axis lead and y-axis lead when an external force is applied to the lever arm.

18. A force transducer comprising:
an elongated lever arm having a fixed end and a free end to which an external force is applied;
a sensing element that includes a substrate having a central portion at which the fixed end of the lever arm is attached and at least two substantially planar tab regions that project outwardly from the central portion along first and second orthogonal force detecting axes, the sensing element further including at least one strain gauge located substantially at the junction of each tab region and the central portion; and
a support structure that supports the sensing element so that the substrate undergoes localized strain approximately at the junctions of the tab regions and the central portion when the external force is applied to the free end of the lever arm; wherein:
each strain gauge includes thick film strain gauge material printed onto the substrate such that the strain gauge material bridges the central portion and a respective tab region of the substrate at each location of the strain gauge material and further includes conductive contacts that are located on the substrate and coupled to the thick film strain gauge material to define an electrical path through the strain gauge material such that an electrical path is defined through each respective strain gauge and is oriented along one of the force detecting axes.

19. A force transducer comprising:
an elongated lever arm having a fixed end and a free end to which an external force is applied;
a substrate having a central portion at which the fixed end of the lever arm is attached and at least two substantially planar tab regions that project outwardly from the central portion along first and second orthogonal force detecting axes so that the substrate undergoes localized strain approximately at the junctions of the tab regions and the central portion when the external force is applied to the free end of the lever arm;
thick film strain gauge material printed onto the substrate in at least a first location and a second location such that the strain gauge material at each location bridges the central portion and a tab region across a respective tab region-central portion junction of localized strain; and conductive contacts on the substrate that are electrically coupled to the thick film strain gauge material at each location to define a first strain gauge having an electrical path through the first location oriented along the first force detecting axis and a second strain gauge having an electrical path through the second location oriented along the second force detecting axis.

20. A force transducer as defined in claim 19, wherein
the substrate includes a top surface and a bottom surface; and
the thick film strain gauge material is located on the top surface of the substrate substantially at the areas of localized strain and the conductive contacts are located such that the electrical path through each strain gauge material is oriented parallel to the direction of localized strain.

21. A force transducer as defined in claim 20, wherein the thick film strain gauge material is located on the top surface and also on the bottom surface, and the conductive contacts are coupled to each location of strain gauge material, so as to define a first strain gauge associated with the first force detecting axis and a second strain gauge associated with the second force detecting axis such that each strain gauge includes strain gauge material of a location of the top surface and strain gauge material of a location of the bottom surface that undergo opposite types of strain when a force is applied to the lever arm, forming a full bridge circuit.

22. A force transducer as defined in claim 21, wherein the force transducer further includes a trim resistor that is electrically coupled to the thick film strain gauge material at each tab region and has a resistance value sufficiently adjustable to balance the resistance value of the electrical circuit formed by the conductive contacts and thick film strain gauge material to within a predetermined accuracy.

23. A force transducer as defined in claim 22, wherein:
the trim resistor comprises a thick film resistive material printed onto the substrate at a trim location; and
the substrate further includes a notch that relieves the trim location of the substrate from undergoing strain when an external force is applied to the lever arm.

24. A method of producing a force transducer, comprising the steps of:
providing a substrate having a central portion and at least two substantially planar tab regions that project outwardly from the central portion along first and second orthogonal force detecting axes;
printing thick film strain gauge material onto the substrate using screen printing techniques in at least a first location and a second location such that the strain gauge material bridges the central portion and a respective tab region at each location of the strain gauge material;
placing conductive contacts on the substrate such that the conductive contacts are electrically coupled to each location of strain gauge material to provide an electrical path through the first location that is oriented along the first force detecting axis, defining a first strain gauge, and to provide an electrical path through the second location oriented along the second force detecting axis, defining a second strain gauge; and
attaching an elongated lever arm to the central portion at a fixed end such that when an external force is applied to an opposite, free end of the lever arm the substrate undergoes localized strain approximately at the junctions of the tab regions and the central portion.

25. A method of producing a force transducer as defined in claim 24, wherein:

the step of providing a substrate further comprises providing a substantially planar substrate that has a top surface and a bottom surface, and includes four tab regions comprising two pairs of opposed tabs that extend along the first and second force detecting axes;
the step of printing further comprises printing thick film strain gauge material onto the top surface of the substrate in first, second, third, and fourth locations substantially at the junction of each tab region and the central portion, and printing thick film strain gauge material onto the bottom surface of the substrate at fifth, sixth, seventh, and eighth locations thereon; and
the step of placing conductive contacts further comprises placing conductive contacts at each location of strain gauge material, defining strain gauges along the first and second axes on the top surface and bottom surface such that corresponding top and bottom surface strain gauge material locations along each force detecting axis differentially experience tension and compression when a lateral force is applied to the lever arm and similarly experience tension or compression when a vertical force is applied to the lever arm, thereby permitting detection of lateral and vertical forces applied to the lever arm.

26. A method of producing a force transducer as defined in claim 24, wherein:
the step of printing thick film strain gauge material comprises locating the strain gauge material on the substrate substantially at the areas of localized strain; and
the step of placing conductive contacts comprises locating the conductive contacts such that the electrical path through each strain gauge material location is parallel to the direction of localized strain.

27. A method of producing a force transducer as defined in claim 26, further including the step of:
providing an adjustable trim resistor that is electrically coupled to the thick film strain gauge material at each tab region and adjusting the resistance value of the trim resistor to balance the resistance value of the electrical circuit formed by the conductive contacts and the thick film strain gauge material to within a predetermined accuracy.

28. A method of producing a force transducer as defined in claim 27, wherein:
the step of providing an adjustable trim resistor comprises printing a thick film resistive material onto the substrate at a trim location; and
the step of providing a substrate further includes providing a notch in the substrate that relieves the substrate trim location from undergoing strain when an external force is applied to the lever arm.

29. A method of producing a force transducer as defined in claim 28, wherein:
the step of providing a substrate includes providing a substrate having a top surface and a bottom surface;
the step of printing thick film strain gauge material includes printing the material on the top surface and the bottom of the substrate substantially at the areas of localized strain; and
the step of placing conductive contacts includes locating the conductive contacts such that the electrical path through each strain gauge material is oriented parallel to the direction of localized strain.

30. A method of producing a force transducer as defined in claim 29, wherein the conductive contacts are coupled to each location of strain gauge material so as to define a first strain gauge associated with the first force detecting axis and a second strain gauge associated with the second force detecting axis such that each strain gauge includes strain gauge material of a location of the top surface and strain gauge material of a location of the bottom surface that undergo opposite types of strain when a force is applied to the lever arm, forming a half bridge circuit.

31. A method of producing a force transducer as defined in claim 30, further including the step of attaching the substrate to a support structure that supports the substrate so that the substrate undergoes localized strain approximately where each tab region joins the central portion when an external force is applied to the lever arm.

32. A method of producing a force transducer as defined in claim 31, wherein the step of attaching the substrate to a support structure comprises:

supporting the substrate at an outer edge of each tab region and at the central portion so that the substrate undergoes localized strain approximately where each tab region joins the central portion when a force is applied laterally to the free end of the lever arm and undergoes substantially no strain when a force is applied vertically along the longitudinal axis of the lever arm.

33. A computer system comprising:

(a) a central processing unit;

(b) a display unit; and (c) a keyboard having a plurality of keys and a control actuator having an elongated lever arm having a fixed end and a free end to which an external force is applied, a sensing element that includes a substrate having a central portion at which the fixed end of the lever arm is attached and at least two substantially planar tab regions that project outwardly from the central portion along first and second orthogonal force detecting axes, the sensing element being located such that the lever arm projects upwardly, the sensing element further including thick film strain gauge material printed onto the substrate in at least first and second locations and including conductive contacts on the substrate that are coupled to the strain gauge material to define a first electrical path and a second electrical path through the strain gauge material and are oriented along the first and second force detecting axes, respectively, and a support structure that supports the sensing element so that the substrate undergoes localized strain approximately at the junctions of the tab regions and the central portion when the external force is applied to the free end of the lever arm.

34. A computer system as defined in claim 33, wherein the lever arm is compliant so as to deflect under the application of external force.

35. A computer system as defined in claim 33, wherein the support structure supports the sensing element substrate at an outer edge of each tab region and at the central portion so that the substrate undergoes localized strain approximately where each tab region joins the central portion when a force is applied laterally to the free end of the lever arm and undergoes substantially no strain when a force is applied vertically along the longitudinal axis of the lever arm.

36. A computer system as defined in claim 33, wherein:

the sensing element substrate is substantially planar, has a top surface and a bottom surface, and includes four tab regions comprising two pairs of opposed tabs that extend along the first and second force detecting axes;

thick film strain gauge material is printed onto the top surface of the substrate in first, second, third, and fourth locations substantially at the junction of each tab region and the central portion, and thick film strain gauge material is printed onto the bottom surface of the substrate at fifth, sixth, seventh, and eighth locations thereon; and conductive contacts are at each location of strain gauge material, defining strain gauges along the first and second axes on the top surface and bottom surface such that corresponding top and bottom surface strain gauge material locations along each force detecting axis differentially experience tension and compression when a lateral force is applied to the lever arm and similarly experience tension or compression when a vertical force is applied to the lever arm, thereby permitting detection of lateral and vertical forces applied to the lever arm.

37. A computer system as defined in claim 33, wherein the thick film strain gauge material is located on the substrate substantially at the areas of localized strain and the conductive contacts are located such that the electrical path through each strain gauge material location is parallel to the direction of localized strain.

38. A computer system as defined in claim 37, wherein the sensing element further includes a trim resistor that is electrically coupled to the thick film strain gauge material at each tab region and has a resistance value sufficiently adjustable to balance the resistance value of the electrical circuit formed by the conductive contacts and thick film strain gauge material to within a predetermined accuracy.

39. A computer system as defined in claim 33, wherein:

the substrate includes a top surface and a bottom surface; and the thick film strain gauge material is located on the top surface of the substrate substantially at the areas of localized strain and the conductive contacts are located such that the electrical path through each strain gauge material is oriented parallel to the direction of localized strain.

40. A computer system as defined in claim 39, wherein the thick film strain gauge material is located on the top surface and also on the bottom surface, and the conductive contacts are coupled to each location of strain gauge material, so as to define a first strain gauge associated with the first force detecting axis and a second strain gauge associated with the second force detecting axis such that each strain gauge includes strain gauge material of a location of the top surface and strain gauge material of a location of the bottom surface that undergo opposite types of strain when a force is applied to the lever arm, forming a half bridge circuit.

41. A computer keyboard comprising:

(a) a keyboard casing;

(b) a plurality of keys; and (c) a control actuator having an elongated lever arm having a fixed end and a free end to which an external force is applied, a sensing element that includes a substrate having a central portion at which the fixed end of the lever arm is attached and at least two substantially planar tab regions that project outwardly from the central portion along first and second orthogonal force detecting axes, the sensing element being located in the keyboard casing such that the lever arm projects upwardly, the sensing element further including thick film strain gauge material printed onto the substrate in at least first and second locations and including conductive contacts on the substrate that are coupled to the strain gauge material to define a first electrical path and a second electrical path through the strain gauge material and are oriented along the first and second force detecting axes, respectively, and a support structure that supports the sensing element so that the substrate undergoes localized strain approximately at the junctions of the tab regions and the central portion when the external force is applied to the free end of the lever arm.

42. A computer keyboard as defined in claim 41, wherein the lever arm is compliant so as to deflect under the application of external force.

43. A computer keyboard as defined in claim 41, wherein the support structure supports the sensing element substrate at an outer edge of each tab region and at the central portion so that the substrate undergoes localized strain approximately where each tab region joins the central portion when a force is applied laterally to the free end of the lever arm and undergoes substantially no strain when a force is applied vertically along the longitudinal axis of the lever arm.

44. A computer keyboard as defined in claim 41, wherein the sensing element substrate is substantially planar, has a top surface and a bottom surface, and includes four tab regions comprising two pairs of opposed tabs that extend along the first and second force detecting axes;

thick film strain gauge material is printed onto the top surface of the substrate in first, second, third, and fourth locations substantially at the junction of each tab region and the central portion, and thick film strain gauge material is printed onto the bottom surface of the substrate at fifth, sixth, seventh, and eighth locations thereon; and conductive contacts are at each location of strain gauge material, defining strain gauges along the first and second axes on the top surface and bottom surface such that corresponding top and bottom surface strain gauge material locations along each force detecting axis differentially experience tension and compression when a lateral force is applied to the lever arm and similarly experience tension or compression when a vertical force is applied to the lever arm, thereby permitting detection of lateral and vertical forces applied to the lever arm.

45. A computer keyboard as defined in claim 41, wherein the thick film strain gauge material is located on the substrate substantially at the areas of localized strain and the conductive contacts are located such that the electrical path through each strain gauge material location is parallel to the direction of localized strain.

46. A computer keyboard as defined in claim 45, wherein the sensing element further includes a trim resistor that is electrically coupled to the thick film strain gauge material at each tab region and has a resistance value sufficiently adjustable to balance the resistance value of the electrical circuit formed by the conductive contacts and thick film strain gauge material to within a predetermined accuracy.

47. A computer keyboard as defined in claim 41, wherein:

the substrate includes a top surface and a bottom surface; and the thick film strain gauge material is located on the top surface of the substrate substantially at the areas of localized strain and the conductive contacts are located such that the electrical path through each strain gauge material is oriented parallel to the direction of localized strain.

48. A computer keyboard as defined in claim 47, wherein the thick film strain gauge material is located on the top surface and also on the bottom surface, and the conductive contacts are coupled to each location of strain gauge material, so as to define a first strain gauge associated with the first force detecting axis and a second strain gauge associated with the second force detecting axis such that each strain gauge includes strain gauge material of a location of the top surface and strain gauge material of a location of the bottom surface that undergo opposite types of strain when a force is applied to the lever arm, forming a half bridge circuit.

* * * * *